(12) United States Patent
Chang

(10) Patent No.: US 6,464,871 B1
(45) Date of Patent: Oct. 15, 2002

(54) FAUCET ASSEMBLY WITH A FILTERING DEVICE DISPOSED IN A FAUCET BODY

(75) Inventor: Ta-Chun Chang, Taichung Hsien (TW)

(73) Assignee: Globe Union Industrial Corp., Taichung Export Processing Zone (TW)

( * ) Notice: Subject to any disclaimer, the term of this patent is extended or adjusted under 35 U.S.C. 154(b) by 0 days.

(21) Appl. No.: 09/621,218

(22) Filed: Jul. 21, 2000

(51) Int. Cl.⁷ .............................................. B01D 27/00
(52) U.S. Cl. ....................... 210/282; 210/418; 210/449
(58) Field of Search ................................. 210/282, 418, 210/449

(56) References Cited

U.S. PATENT DOCUMENTS

| | | | |
|---|---|---|---|
| 363,120 A | * | 5/1887 | Cummings ................... 210/449 |
| 5,108,606 A | * | 4/1992 | Maglio ........................ 210/418 |
| 5,126,041 A | * | 6/1992 | Weber et al. ................ 210/449 |
| 5,705,067 A | * | 1/1998 | Sumi et al. .................. 210/282 |

* cited by examiner

*Primary Examiner*—Ivars Cintins
(74) *Attorney, Agent, or Firm*—Akin, Gump, Strauss, Hauer & Feld, L.L.P.

(57) ABSTRACT

A faucet assembly includes a faucet body having an upright portion defining a cartridge receiving chamber. The faucet body further has an inlet passage in fluid communication with the cartridge receiving chamber and connected fluidly to a water supply source, and an outlet passage in fluid communication with the cartridge receiving chamber. A filtering device includes a filtering cartridge that is disposed removably within the cartridge receiving chamber, and that has an outer wall surface cooperating with the upright portion to define upper and lower watertight seals therebetween, and an inner wall surface that defines a water passage chamber between the upper and lower watertight seals. The water passage chamber has upper and lower ends that are in fluid communication with the outlet and inlet passages of the cartridge receiving chamber. A spout unit is attached to the upright portion of the faucet body, and includes a spout pipe with a discharging port for release of filtered water therefrom. A valve is mounted within the faucet body. A control knob is connected operably with the valve, and is exposed outwardly to the faucet body for regulating and stopping water flow from the faucet body to the spout pipe.

6 Claims, 6 Drawing Sheets

FAUCET ASSEMBLY WITH A FILTERING DEVICE DISPOSED IN A FAUCET BODY

BACKGROUND OF THE INVENTION

1. Field of the Invention

This invention relates to a faucet assembly, more particularly to a faucet assembly with a filtering device disposed in a faucet body.

2. Description of the Related Art

Referring to FIG. 1, a conventional faucet assembly is shown to include a faucet body 1, a tubular housing 2, a spout 4 and a control knob 3.

As illustrated, the faucet body 1 defines a water passage chamber having a cold water inlet adapted to be connected fluidly with a cold water supply source 114, a hot water inlet adapted to be connected fluidly with a hot water supply source 115, and a water outlet for discharging water therefrom.

The tubular housing 2 is sleeved rotatably around the faucet body 1, and has a peripheral wall with upper and lower ends establishing a water-tight seal in cooperation with the faucet body 1 so as to define an annular chamber between the tubular housing 2 and the faucet body 1, and between the upper and lower ends of the peripheral wall. The annular chamber is in fluid communication with the water passage chamber via the water outlet. The housing 2 further has a spout mounting port which is in fluid communication with the annular chamber and from which the spout 4 extends integrally and outwardly so as to guide the water inside the annular chamber to an exterior of the faucet assembly.

The control knob 3 is mounted on the tubular housing 2 for regulating and stopping flow of the water from the annular chamber to the exterior of the faucet assembly.

Note that water discharged from the aforesaid faucet assembly is not filtered and is thus fit only for washing and common use. In order to obtain drinking water, a two-spout faucet assembly 100 (see FIG. 1A) is provided with two spouts that are spaced apart from each other. As a result, a relatively large sink is needed to be disposed under the two spouts of the assembly 100 (see FIG. 1A).

SUMMARY OF THE INVENTION

Therefore, the object of this invention is to provide a faucet assembly with a filtering device disposed in a faucet body so as to minimize the dimension thereof and so as to facilitate replacement of a filtering cartridge in the faucet body. In addition, only a volume-reduced sink is required for mounting the faucet assembly of the present invention.

Accordingly, the faucet assembly of the present invention includes a faucet body, a filtering device, a spout unit, a valve and a control knob. The faucet body includes an upright portion that defines a cylindrical cartridge receiving chamber with upper and lower ends, an inlet passage that is in fluid communication with the lower end of the cartridge receiving chamber and that is adapted to be connected fluidly to a water supply source, and an outlet passage that is in fluid communication with the upper end of the cartridge receiving chamber. The filtering device includes a filtering cartridge which is disposed removably within the cartridge receiving chamber and which has an outer wall surface that cooperates with the upright portion of the faucet body to define upper and lower watertight seals therebetween, and an inner wall surface that defines a water passage chamber between the upper and lower watertight seals. The water passage chamber has upper and lower ends that are in fluid communication with the outlet and inlet passages of the cartridge receiving chamber, respectively. The spout unit is attached to the upright portion of the faucet body, and includes a spout pipe which is in fluid communication with the outlet passage of the water passage chamber and which is formed with a discharging port for release of filtered water therefrom. The valve is mounted within the faucet body. The control knob is connected operably with the valve, and is exposed outwardly to the faucet body for regulating and stopping water flow from the faucet body to the spout pipe.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
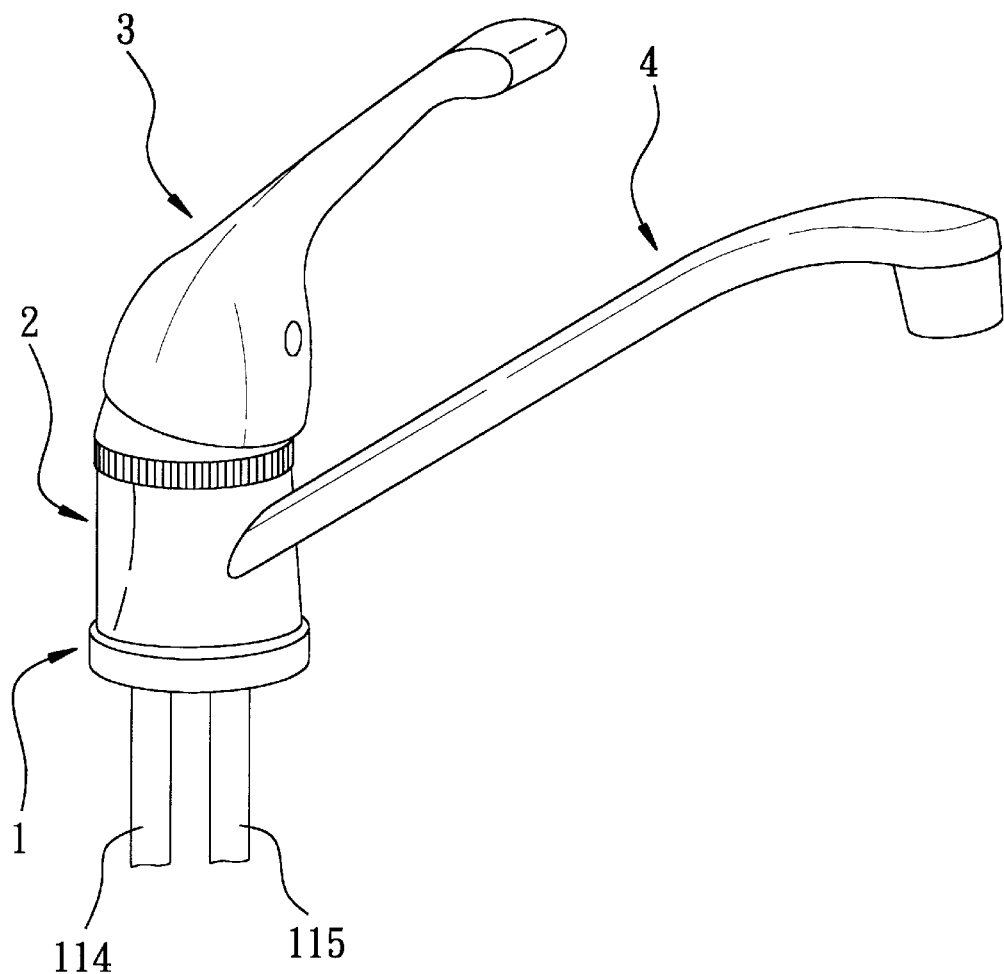
FIG. 1 is a perspective view of a conventional faucet assembly.
Figure 1A:
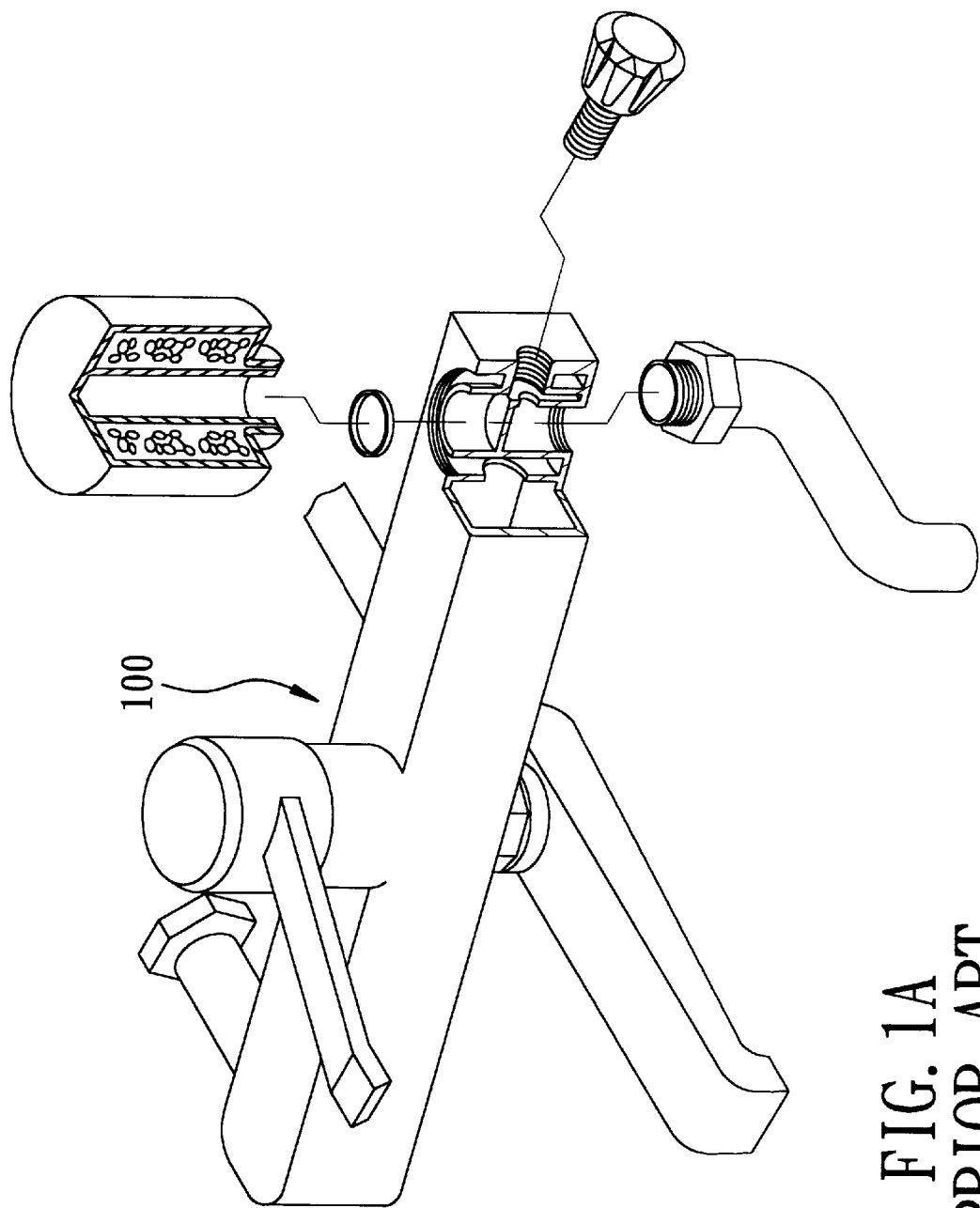
FIG. 1A is an partly exploded view of a conventional two-spout faucet assembly.
Figure 2:
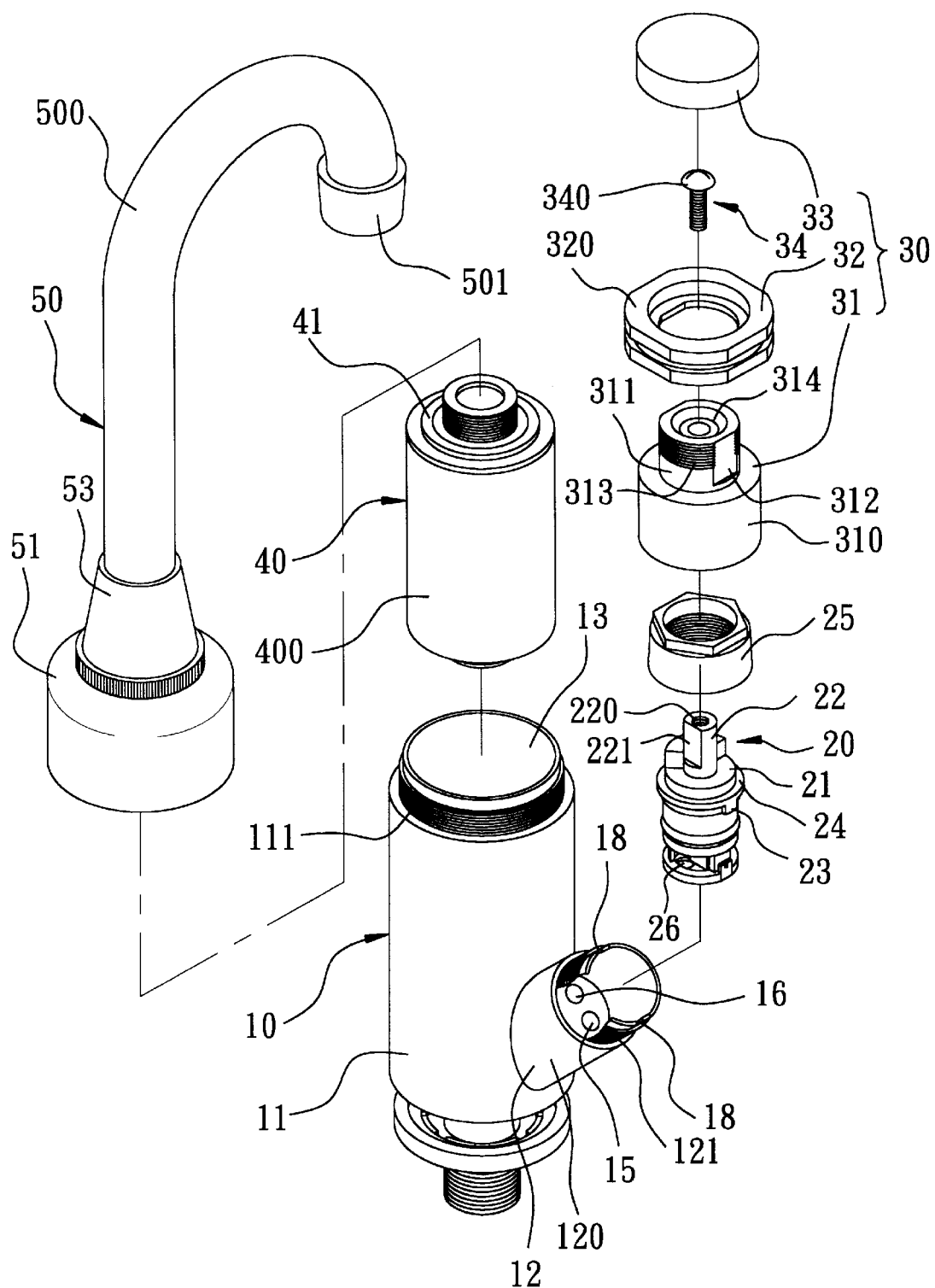
FIG. 2 is an exploded view of a first preferred embodiment of a faucet assembly according to the present invention.
Figure 3:
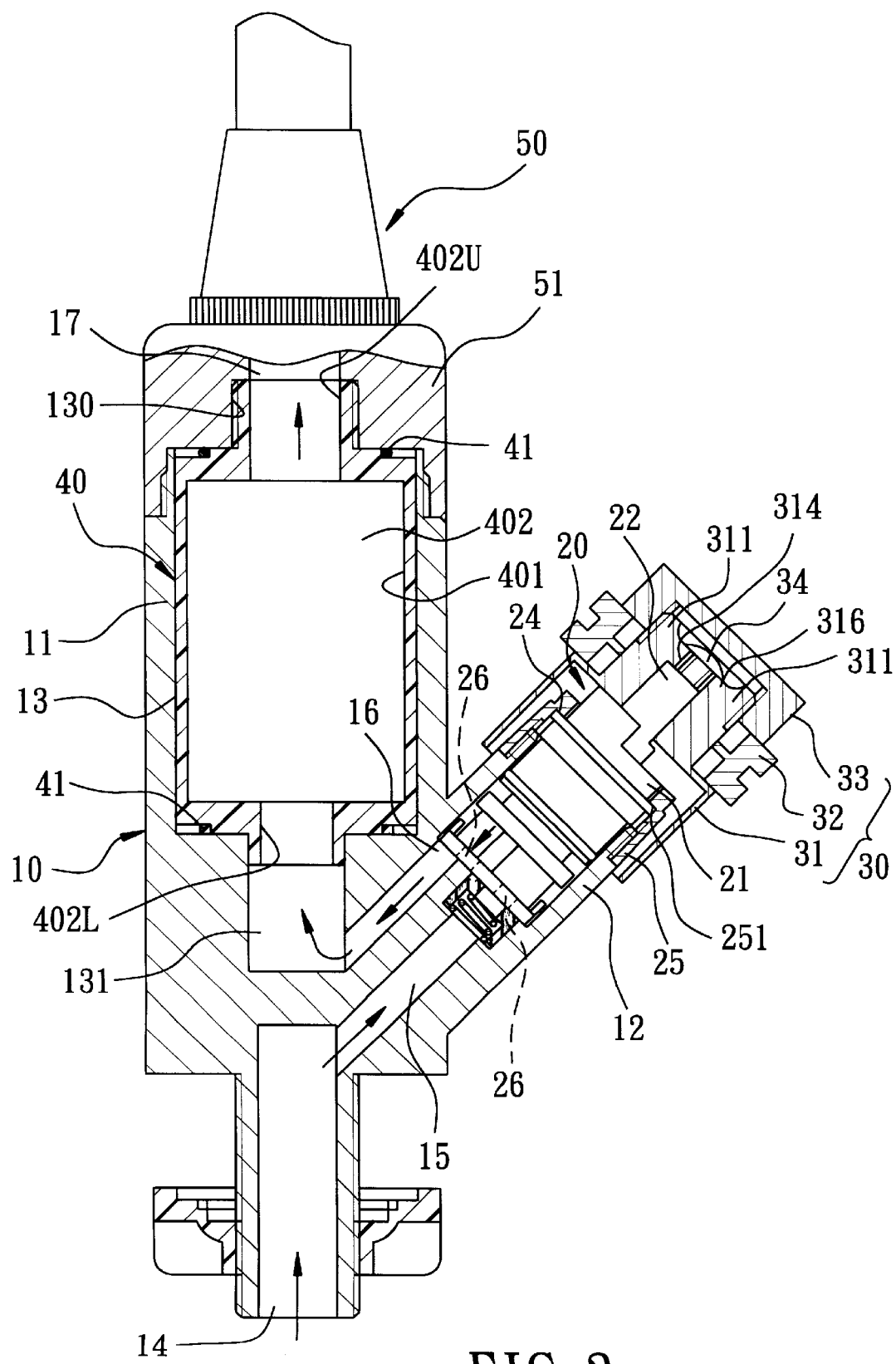
FIG. 3 is a sectional view of the first preferred embodiment.
Figure 4:
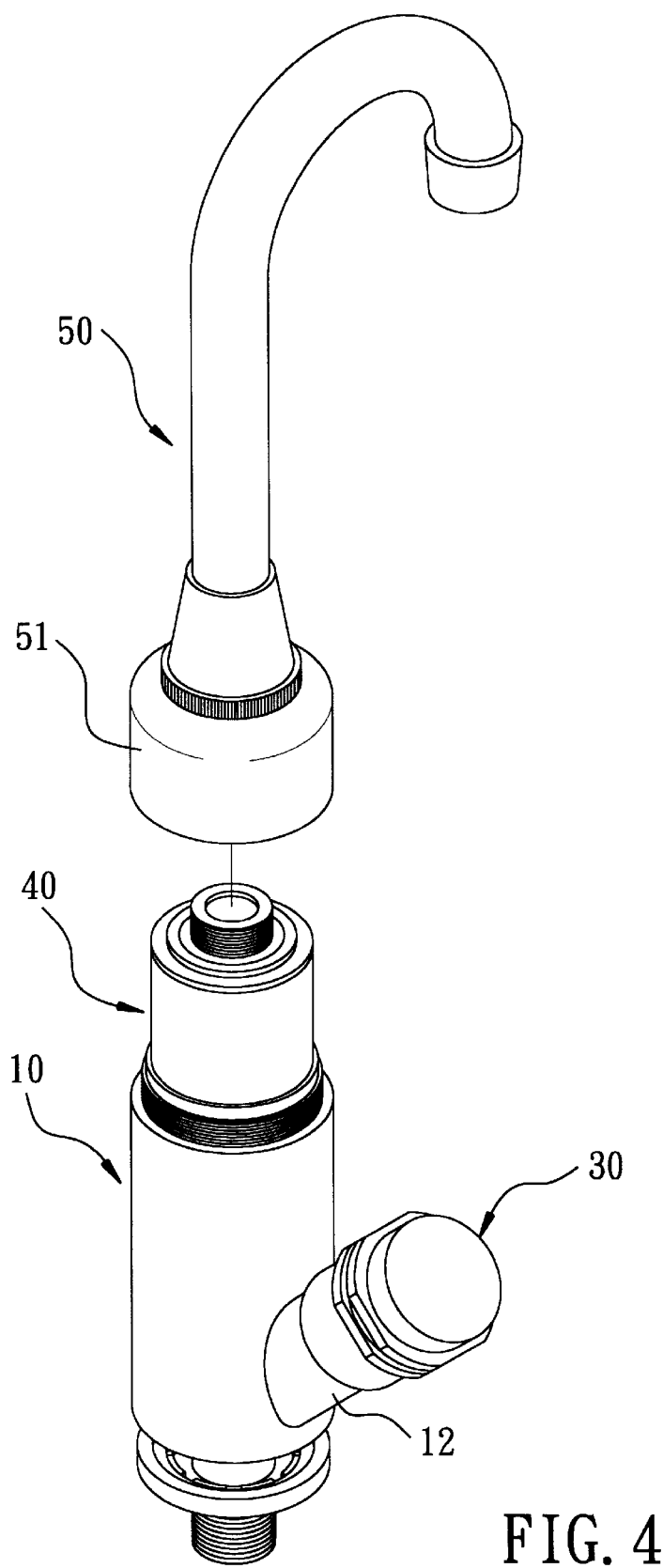
FIG. 4 is a partly exploded view of the first preferred embodiment.
Figure 5:
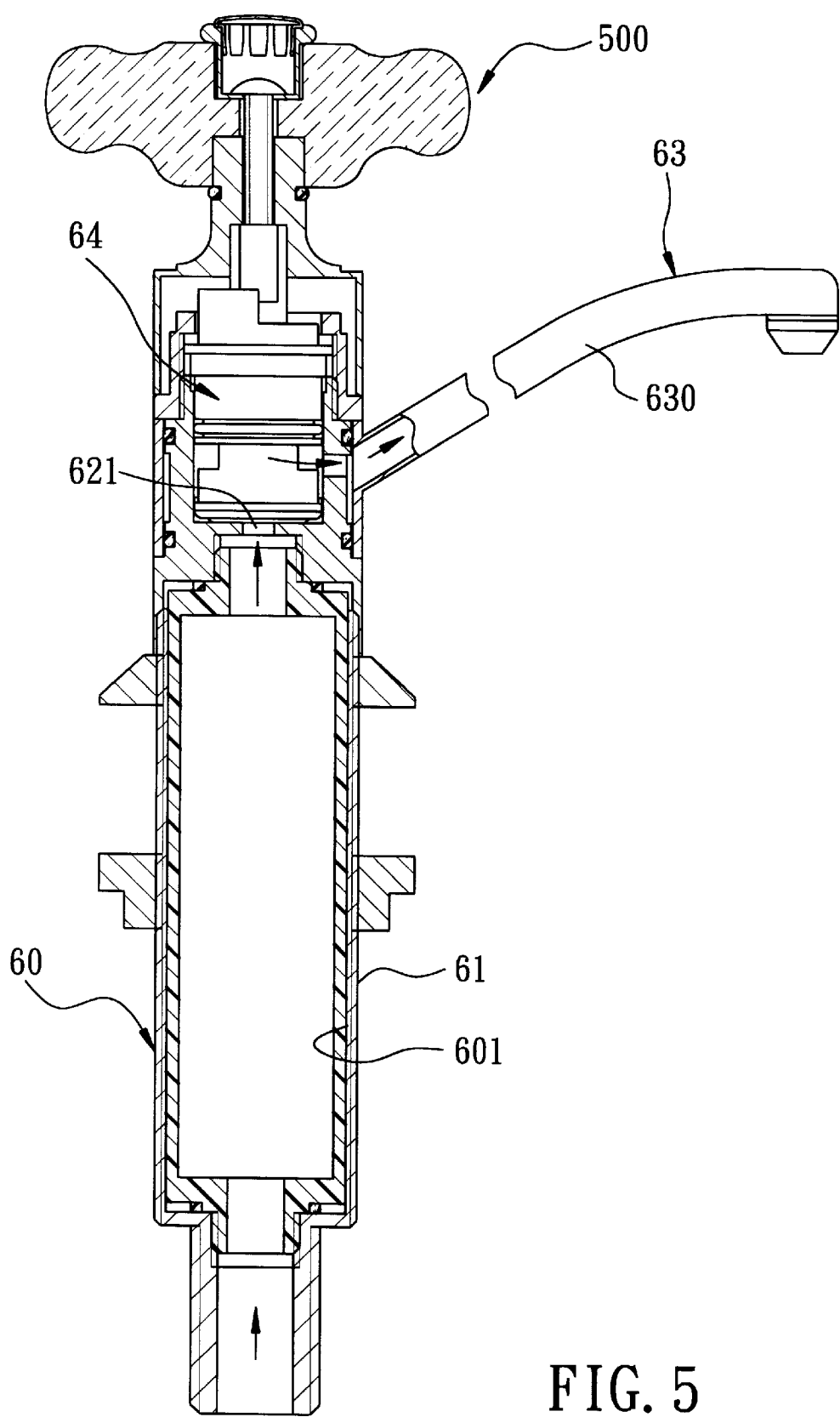
FIG. 5 is a sectional view of a second preferred embodiment of the present invention.

Referring to FIGS. 2, 3 and 4, the first preferred embodiment of a faucet assembly according to the present invention is shown to include a faucet body 10, a filtering device 40, a spout unit 50, a valve 20, and a control knob 30.

As illustrated, the faucet body 10 is adapted to be mounted on a sink (not shown), and includes an upright portion 11 that defines a cylindrical cartridge receiving chamber 13 with upper and lower ends 130,131, an inlet passage 14 that is in fluid communication with the lower end 131 of the cartridge receiving chamber 13 and that is adapted to be connected fluidly to a water supply source (not shown), and an outlet passage 17 that is in fluid communication with the upper end 130 of the cartridge receiving chamber 13.

The filtering device 40 includes a filtering cartridge 40 which is disposed removably within the cartridge receiving chamber 13 and which has an outer wall surface 400 that cooperates with the upright portion 11 of the faucet body 10 to define upper and lower watertight seals therebetween via water seals 41, and an inner wall surface 401 that defines a water passage chamber 402 between the seals 41. The water passage chamber 402 has upper and lower ends (402U, 402L) that are in fluid communication with the outlet and inlet passages 17,14, respectively.

The spout unit 50 is attached to the upright portion 11 of the faucet body 10 by a cover unit 51 that is mounted threadedly on the upright portion 11 to define the cartridge receiving chamber 13 therebetween. The spout unit 50 includes a spout pipe 500 which is in fluid communication with the outlet passage 17 of the water passage chamber 13 and which is formed with a discharging port 501 for release of filtered water therefrom. Note that the spout pipe 500 is mounted on the cover unit 51 by means of a truncated cone sleeve 53.

The valve 20 is mounted within the faucet body 10.

The control knob 30 is connected operably with the valve 20, and is exposed outwardly to the faucet body 10 for regulating and stopping water flow from the faucet body 10 to the spout pipe 500.

The faucet body 10 has an oblique tubular portion 12 which extends integrally, outwardly and upwardly from a lower end portion of the upright portion 11 so as to mount the control knob 30 on an upper end thereof and so as to mount the valve 20 therein. The upright portion 1211 of the faucet body 10 has an externally threaded upper end 111. The spout unit 50 has an internally threaded lower end 51 that engages threadedly the upper end 111 of the upright portion 11 of the faucet body 10.

The tubular portion 11 of the faucet body 10 has a water inlet 15 that is adapted to be connected fluidly with the water supply source, and a water outlet 16 that is in fluid communication with the lower end 131 of the cartridge receiving chamber 13 in the upright portion 11 of the faucet body 10. The valve 20 is journalled within the tubular portion 12 of the faucet body 10, and has two valve holes 26 at a lower end portion thereof. The control knob 30 is connected to the valve 20 so as to rotate synchronously therewith. The valve holes 26 are capable of registering respectively with the water inlet 15 and the water outlet 16 so as to communicate fluidly therewith, thereby permitting flow of water from the water supply source to the lower end 131 of the cartridge receiving chamber 13. Thus, the inlet passage 14 of the chamber 13 is formed by the water inlet 15, the water outlet 16 and the valve holes 26 of the valve 20.

The oblique tubular portion 12 of the faucet body 10 is defined by a surrounding wall 120 that is formed with two aligned slide slots 18. In order to complement with the tubular portion 12, the valve 20 has two diametrically opposed integral projections 23 that are received slidably within the slide slots 18 thereof. Each of the slide slots 18 has two ends. The valve holes 26 in the valve 20 register with the water inlet 15 and the water outlet 16, respectively, when the projections 23 move to one of the ends of the slide slots 18, and deflect from the water inlet 15 and the water outlet 16, respectively, when the projections 23 in the valve 20 move to the other one of the ends of the slide slots 18.

In the first preferred embodiment, the tubular portion 12 of the faucet body 10 has an externally threaded upper end 121. The valve 20 has an upper end portion 21 that is formed with a shoulder 24. An internally threaded valve retaining ring 25 engages threadedly the threaded upper end 121 of the tubular portion 12 of the faucet body 10, and has an inner surface that is formed with a shoulder 251. The shoulder 24 of the valve 20 abuts against the shoulder 251 of the retaining ring 25 so as to prevent removal of the valve 20 from the tubular portion 12 of the faucet body 10.

The valve 20 preferably has an integral upper end post 22 which is formed with two opposite flat side surfaces 221 (only one is visible in FIG. 2) that are parallel to each other and which has an end surface that is formed with a threaded hole 220. The control knob 30 includes a sleeve 31, a rotary ring 32, a bolt 34, and an internally threaded cap 33. The sleeve 31 has a large-diameter lower portion 310 disposed around the retaining ring 25, and a small-diameter upper portion 311 having an outer diameter smaller than that of the large-diameter lower portion 310, and a central bore 314 that engages fittingly the upper end post 22 of the valve 20 so as to rotate the sleeve 31 and the valve 20 synchronously. The small-diameter upper portion 311 further has two opposite flat side surfaces 312 that are parallel to each other, an externally threaded upper end 313, and an inwardly extending flange 316 that defines a bolt hole therein. The rotary ring 32, through which the small-diameter upper portion 311 of the sleeve 31 extends, defines a central hole 320 that engages the small-diameter upper portion 311 of the sleeve 31 fittingly, thereby rotating synchronously therewith. The bolt 34 has a head 340 that abuts against the flange 316 of the sleeve 31, and engages the threaded hole 220 in the upper end post 22 of the valve 20, thereby retaining the sleeve 31 on the valve 20. The cap 33 engages threadedly the externally threaded upper end 313 of the sleeve 31, and abuts against an upper end surface 320 of the rotary ring 32, thereby retaining the rotary ring 32 on the sleeve 31.

Referring to FIG. 4, the second preferred of the present invention is shown to be similar to the first preferred embodiment in structure except in the positions of the valve 64 and the spout unit 63 with respect to the cartridge receiving chamber 601. The spout unit 63 includes a spout pipe 630 that extends integrally, upwardly and outwardly from an upper end portion 62 of the upright portion 61 of the faucet body 60. The valve 64 is disposed within the upright portion 61 of the faucet body 60, and is located over the cartridge receiving chamber 601 and between the outlet passage 621 in the faucet body 60 and the spout pipe 630. The control knob 500 is shaped as a rotary knob which is disposed rotatably on an upper end of the upright portion 61 of the faucet body 60 and which is connected to the valve 64 so as to rotate synchronously therewith. The features and objects are the same as those of the first preferred embodiment.

Since the faucet body in each of the preferred embodiments is formed by upper and lower faucet portions, when changing the filtering cartridge, the latter can be easily removed from the faucet body after loosening the upper and lower faucet portions. In addition, since the lower faucet portion is used for mounting on a sink, only a volume-reduced sink is required for mounting the faucet body of the preferred embodiments. The object of the invention is thus met.

With this invention thus explained, it is apparent that numerous modifications and variations can be made without departing from the scope and spirit of this invention. It is therefore intended that this invention be limited only as indicated by the appended claims.

I claim:

1. A faucet assembly comprising:
    a faucet body including an upright portion that defines a cylindrical cartridge receiving chamber with upper and lower ends, said upper end of said upright portion having an externally threaded portion, an oblique tubular portion which extends integrally, outwardly and upwardly from a lower end portion of said upright portion, an inlet passage that is in fluid communication with said lower end of said cartridge receiving chamber and that is adapted to be connected fluidly to a water supply source, and an outlet passage that is in fluid communication with said upper end of said cartridge receiving chamber;
    a filtering device including a filtering cartridge which is disposed removably within said cartridge receiving chamber and which has an outer wall surface that cooperates with said upright portion of said faucet body to define upper and lower watertight seals therebetween, and an inner wall surface that defines a water passage chamber between said upper and lower watertight seals, said water passage chamber having upper and lower ends which define respective outlet and inlet passages that are in fluid communication with said faucet body upper and lower ends, respectively;

a spout unit attached to said upright portion of said faucet body, and including a spout pipe which is in fluid communication with said outlet passage of said water passage chamber and which is formed with a discharging port for release of filtered water therefrom, said spout unit having an internally threaded lower end that engages threadedly said upper end of said upright portion of said faucet body;

a valve mounted within said oblique tubular portion of the faucet body; and a control knob mounted on an upper end of said oblique tubular portion of the faucet body, said control knob connected operably with said valve and exposed outwardly to said faucet body for regulating and stopping water flow from said faucet body to said spout pipe.

2. The faucet assembly as defined in claim 1, wherein said oblique tubular portion of said faucet body has a water inlet that is adapted to be connected fluidly with the water supply source, and a water outlet that is in fluid communication with said lower end of said cartridge receiving chamber in said upright portion of said faucet body, said valve being journalled within said oblique tubular portion of said faucet body and having two valve holes, said control knob being connected to said valve so as to rotate synchronously therewith, said valve holes being capable of registering respectively with said water inlet and said water outlet so as to communicate fluidly therewith, thereby permitting flow of water from the water supply source to said lower end of said cartridge receiving chamber, said inlet passage including said water inlet, said water outlet and said valve holes.

3. The faucet assembly as defined in claim 2, wherein said oblique tubular portion of said faucet body has a wall that is formed with two aligned slide slots, said valve having two diametrically opposed integral projections that are received slidably within said slide slots, each of said slide slots having two ends, said valve holes registering with said water inlet and said water outlet, respectively, when each of said projections moves to one of said ends of a respective one of said slide slots, and deflecting from said water inlet and said water outlet, respectively, when each of said projections moves to the other one of said ends of the respective one of said slide slots.

4. The faucet assembly as defined in claim 2, wherein said oblique tubular portion of said faucet body has an externally threaded upper end, said valve having an upper end portion that is formed with a shoulder, said faucet assembly further including an internally threaded valve retaining ring which engages threadedly said externally threaded upper end of said oblique tubular portion of said faucet body and which has an inner surface that is formed with a shoulder, said shoulder of said valve abutting against said shoulder of said retaining ring so as to prevent removal of said valve from said faucet body.

5. The faucet assembly as defined in claim 4, wherein said valve has an integral upper end post which is formed with two opposite flat side surfaces that are parallel to each other and which has an end surface that is formed with a threaded hole, said control knob including:

a sleeve having a large-diameter lower portion disposed around said valve retaining ring, and a small-diameter upper portion which has an outer diameter smaller than that of said large-diameter lower portion, a central bore that engages fittingly said upper end post of said valve so as to rotate said sleeve and said valve synchronously, two opposite flat side surfaces that are parallel to each other, an externally threaded upper end, and an inwardly extending flange that defines a bolt hole therein;

a rotary ring, through which said small-diameter upper portion of said sleeve extends, said rotary ring defining a central hole that engages said small-diameter upper portion of said sleeve fittingly, thereby rotating synchronously therewith;

a bolt having a head that abuts against said flange of said sleeve and engaging said threaded hole in said upper end post of said valve, thereby retaining said sleeve on said valve; and an internally threaded cap that engages threadedly said externally threaded upper end of said sleeve and abutting against an upper end surface of said rotary ring, thereby retaining said rotary ring on said sleeve.

6. A faucet assembly comprising:

a faucet body including an upright portion that defines a cylindrical cartridge receiving chamber with upper and lower ends, an inlet passage that is in fluid communication with said lower end of said cartridge receiving chamber and that is adapted to be connected fluidly to a water supply source, and an outlet passage that is in fluid communication with said upper end of said cartridge receiving chamber;

a filtering device including a filtering cartridge which is disposed removably within said cartridge receiving chamber and which has an outer wall surface that cooperates with said upright portion of said faucet body to define upper and lower watertight seals therebetween, and an inner wall surface that defines a water passage chamber between said upper and lower watertight seals, said water passage chamber having upper and lower ends which define respective outlet and inlet passages that are in fluid communication with said cartridge receiving chamber upper and lower ends, respectively;

a spout unit attached to said upright portion of said faucet body and, including a spout pipe which extends integrally, upwardly and outwardly from an upper end portion of said upright portion of said faucet body, which is in fluid communication with said outlet passage of said water passage chamber and which is formed with a discharging port for release of filtered water therefrom;

a valve mounted within said upright portion of said faucet body, and being located over said cartridge receiving chamber and between said outlet passage in said faucet body and said spout pipe; and a control knob being shaped as a rotary knob and being disposed rotatably on an upper end of said upright portion of said faucet body, said control knob being exposed outwardly from said faucet body and connected operably with said valve so as to rotate synchronously therewith in order to regulate and stop the flow of water from said faucet body to said spout pipe.

* * * * *